(12) United States Patent
Ushiro

(10) Patent No.: US 6,600,506 B2
(45) Date of Patent: Jul. 29, 2003

(54) PRINTER IN WHICH PHOTOSENSITIVE MATERIAL IS USED

(75) Inventor: Seimei Ushiro, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 22 days.

(21) Appl. No.: 09/897,441

(22) Filed: Jul. 3, 2001

(65) Prior Publication Data
US 2002/0054327 A1 May 9, 2002

(30) Foreign Application Priority Data
Jul. 4, 2000 (JP) ........................................ 2000-202071

(51) Int. Cl.[7] ............................................... B41J 27/00
(52) U.S. Cl. ........................................ 347/241; 347/256
(58) Field of Search ............................... 347/241, 244, 347/256, 258; 396/310, 329, 341, 344, 374, 352, 385; 348/207.2

(56) References Cited

U.S. PATENT DOCUMENTS 5,687,411 A * 11/1997 Matsuzaki et al. .......... 396/310
5,802,413 A 9/1998 Stephenson ................. 396/429
5,933,183 A 8/1999 Enomoto et al. ............ 347/241
6,449,439 B1 * 9/2002 Boyd et al. .................. 396/374

FOREIGN PATENT DOCUMENTS

| GB | 2 018 085 A | 10/1979 |
| JP | A-4-194832 | 7/1992 |
| JP | A-6-83243 | 3/1994 |
| JP | A-80271995 | 10/1996 |
| JP | A-11-305342 | 11/1999 |

* cited by examiner

Primary Examiner—Hai Pham
(74) Attorney, Agent, or Firm—Young & Thompson

(57) ABSTRACT

A printer includes an LED light source for emitting illuminating light. An LCD panel displays an image, and emits printing light upon being illuminated with the illuminating light. An exposing optical system focuses the printing light on a photosensitive surface of an instant photo film unit. A movable mirror is disposed so that a movable panel lying on its rear constitutes one portion of a printer outer surface. The movable panel is movable between first and second positions, and protrudes from the printer outer surface when set in the first position, for the movable mirror to form a printing light path from the exposing optical system to the instant photo film unit. The movable panel is flush with the printer outer surface when set in the second position, for the movable mirror to prevent forming of the printing light path.

25 Claims, 5 Drawing Sheets

PRINTER IN WHICH PHOTOSENSITIVE MATERIAL IS USED

BACKGROUND OF THE INVENTION

1. Field of the Invention

The present invention relates to a printer in which photo sensitive material is used. More particularly, the present invention relates to a printer in which photo sensitive material is used, in which an image is displayed in a display panel and projected to photosensitive material, and which can have a reduced size.

2. Description Related to the Prior Art

Images are photographed by a video camera or digital still camera. Photographic prints are obtained by photographing images in a photographic camera. For similar purposes, there is a commercially available color printer in which data of a full-color image is converted into a digital image signal to produce a print. Examples of such color printers are disclosed in GB-A 2 018 085 (corresponding to JP-B 1-024394) and JP-A 6-083243 and 8-271995. Photosensitive material is used as recording material. A printing head includes a great number of light-emitting elements having a minute size for emitting light of three colors one color after another. The printing head scans the entirety of a printing zone of the photosensitive material, to print a full-color image by exposure.

However, the color printer according to the prior art has shortcomings. A hard copy of an image is desired to be printed as soon as the image is photographed. However, known types of color printers have a considerable size and do not have high portability. It is remarkably difficult for a user to carry the color printer manually.

SUMMARY OF THE INVENTION

In view of the foregoing problems, an object of the present invention is to provide a printer in which photo sensitive material is used, which can have a reduced size and a small weight, and in which prints can be produced at a high quality.

In order to achieve the above and other objects and advantages of this invention, a printer includes a light source for emitting illuminating light. An electronic display panel displays an image, and emits printing light upon being illuminated with the illuminating light. An exposing optical system focuses the printing light on a photosensitive surface of photosensitive material. A printing light path former is disposed to constitute one portion of a printer outer surface, movable between first and second positions, for protruding from the printer outer surface when set in the first position, to form a printing light path from the exposing optical system to the photosensitive material, and for being substantially flush with the printer outer surface when set in the second position, to prevent forming of the printing light path.

Furthermore, there is a viewing window observable externally. A viewing optical system directs the printing light to the viewing window. A light path changer is disposed in a light path between the display panel and the exposing optical system, shiftable between third and fourth positions, for directing the printing light to the exposing optical system when set in the third position, and for directing the printing light to the viewing optical system when set in the fourth position.

The printing light path former includes a movable panel, and a first movable mirror secured to an inside of the movable panel. The light path changer includes a second movable mirror.

The exposing optical system includes an enlarging lens for enlarging the image. A stationary mirror reflects the printing light passed through the enlarging lens toward the first movable mirror.

Furthermore, a loading chamber is loaded with the photosensitive material so oriented as to direct upwards photosensitive surface. A printer upper wall constitutes the printer outer surface. An opening is formed in the printer upper wall, and closed openably by the movable panel in a manner swingable from the printer upper wall. Bellows is connected between peripheries of the movable panel and the opening, for preventing ambient light from entry into the printing light path through the opening when the movable panel is set in the first position.

The photosensitive material is color photosensitive material. The light source includes at least first, second and third groups of light-emitting diodes, arranged in at least one array, for generating the illuminating light of respectively first, second and third primary colors.

Furthermore, a mode selector designates a selected one of a printing mode and a viewing mode, for setting the second movable mirror in the third position when the printing mode is designated, and for setting the second movable mirror in the fourth position when the viewing mode is designated.

Furthermore, a bias mechanism biases the movable panel toward the first position. A lock mechanism locks the movable panel in the second position, and for unlocking the movable panel when the mode selector designates the printing mode.

There is a printer front wall where the viewing window is disposed. An exit slot is formed in the printer front wall, for exiting the photosensitive material being exposed.

The display panel is a transmittance type of liquid crystal display panel for converting the illuminating light into the printing light by passage when a rear surface thereof is illuminated by the light source.

The photosensitive material is an instant photo film unit. Furthermore, a pair of spreader rollers processes the instant photo film unit being exposed, and ejects the instant photo film unit from the loading chamber.

The loading chamber is loaded with a photosensitive material pack. The photosensitive material pack includes a case. A stack of plural photosensitive materials are contained in the case.

The display panel and the light source are supplied by a battery with power.

The printer is connected with a digital camera and/or storage device. The display panel displays the image according to image data input by the digital camera and/or storage device.

In a preferred embodiment, the display panel is a reflection type of liquid crystal display panel for converting the illuminating light into the printing light by reflection when a front surface thereof is illuminated by the light source.

In another preferred embodiment, the display panel includes plural rotatable micromirrors arranged in a matrix form, and converts the illuminating light into the printing light by reflection when the micromirrors in an effective position of reflection are illuminated by the light source.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
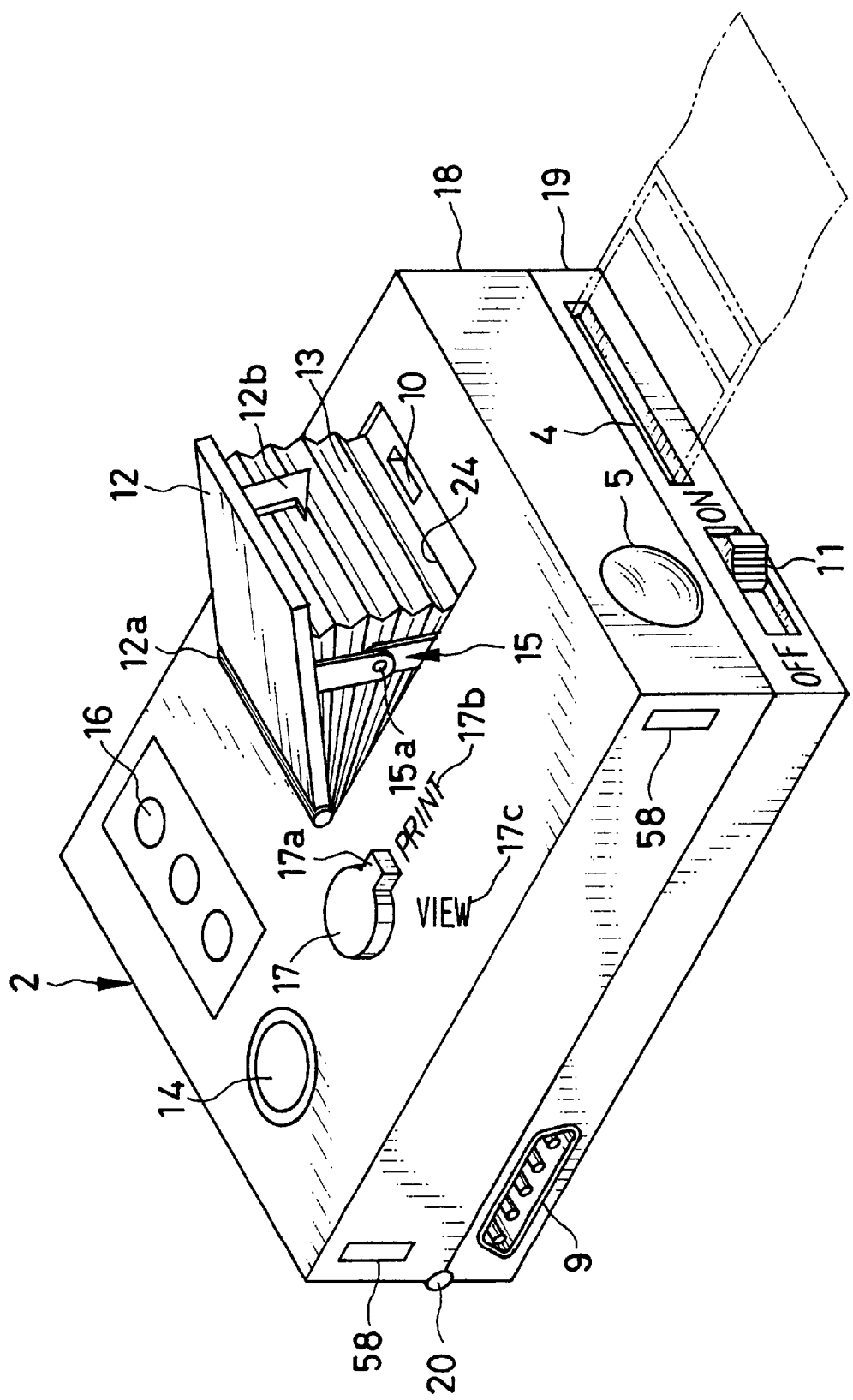
FIG. 1 is a perspective illustrating a printer of the invention.

In FIG. 1, a printer 2 of the present invention is illustrated, and has a box shape with such a small thickness that the printer 2 can be carried easily with high portability. The printer 2 is for use with instant photo film units of a mono-sheet type as photosensitive material for printing an image.

A front wall of the printer 2 is provided with an exit slot 4, a viewing window 5 and a power switch 11. The exit slot 4 is adapted to exiting instant photo film units 25 as photosensitive materials. The viewing window 5 is used for observing and checking an image to be printed. There are connection terminals 9 disposed in a lateral wall of the printer 2.

In the top face of the printer 2 are a movable support plate or movable panel 12 as printing light path former, a print starting button 14, an operation panel 16 and a mode selector 17. The operation panel 16 includes various buttons, keys or the like for entry of command signals.

The mode selector 17 is adapted to designating one of a printing mode and a viewing mode. The printing mode is used to print an image. The viewing mode is used to observe the image to be printed. A projection 17a of the mode selector 17 is positioned at one of a printing mode pointer 17b and a viewing mode pointer 17c disposed close to the periphery of the mode selector 17. One of the printing mode pointer 17b and the viewing mode pointer 17c is determined effective by positioning of the projection 17a to set one of the printing mode and the viewing mode.

A hinge 12a keeps the movable panel 12 movable pivotally. A spring 12c is incorporated in the hinge 12a for biasing the movable panel 12 in its open position depicted in FIG. 2. A hook 12b is formed with the movable panel 12. A lock mechanism 10 includes an engageable portion (not shown). When the movable panel 12 is closed, the hook 12b becomes engaged with the engageable portion to lock the movable panel 12 in the closed position.

Note that, in the drawing, the spring 12c is depicted in a virtual form helpful in clarifying a biasing direction. An actual example of the spring 12c is a torsion coil spring or the like.

When the mode selector 17 is changed over to the printing mode, the lock mechanism 10 unlocks the movable panel 12. The spring 12c incorporated in the hinge 12a causes the movable panel 12 to rotate toward an open position. At the same time, a bellows 13 is unfolded. A printer upper wall or cover 18 of the printer 2 is connected to the movable panel 12 by the bellows 13, which prevents ambient light from entry through an upper opening 24 into the printer 2. When the movable panel 12 is in the closed position, the bellows 13 is folded and contained in the printer 2.

Connection stays 15 connect the movable panel 12 to the printer upper wall 18. A hinge 15a between the connection stays 15 operates to shorten and fold the connection stays 15 in pivotal movement. When the movable panel 12 is in the closed position, the connection stays 15 are folded to contain the movable panel 12. When the movable panel 12 is rotated, the connection stays 15 are unfolded in a straight form as depicted, to keep the movable panel 12 in the open position.

Figure 3:
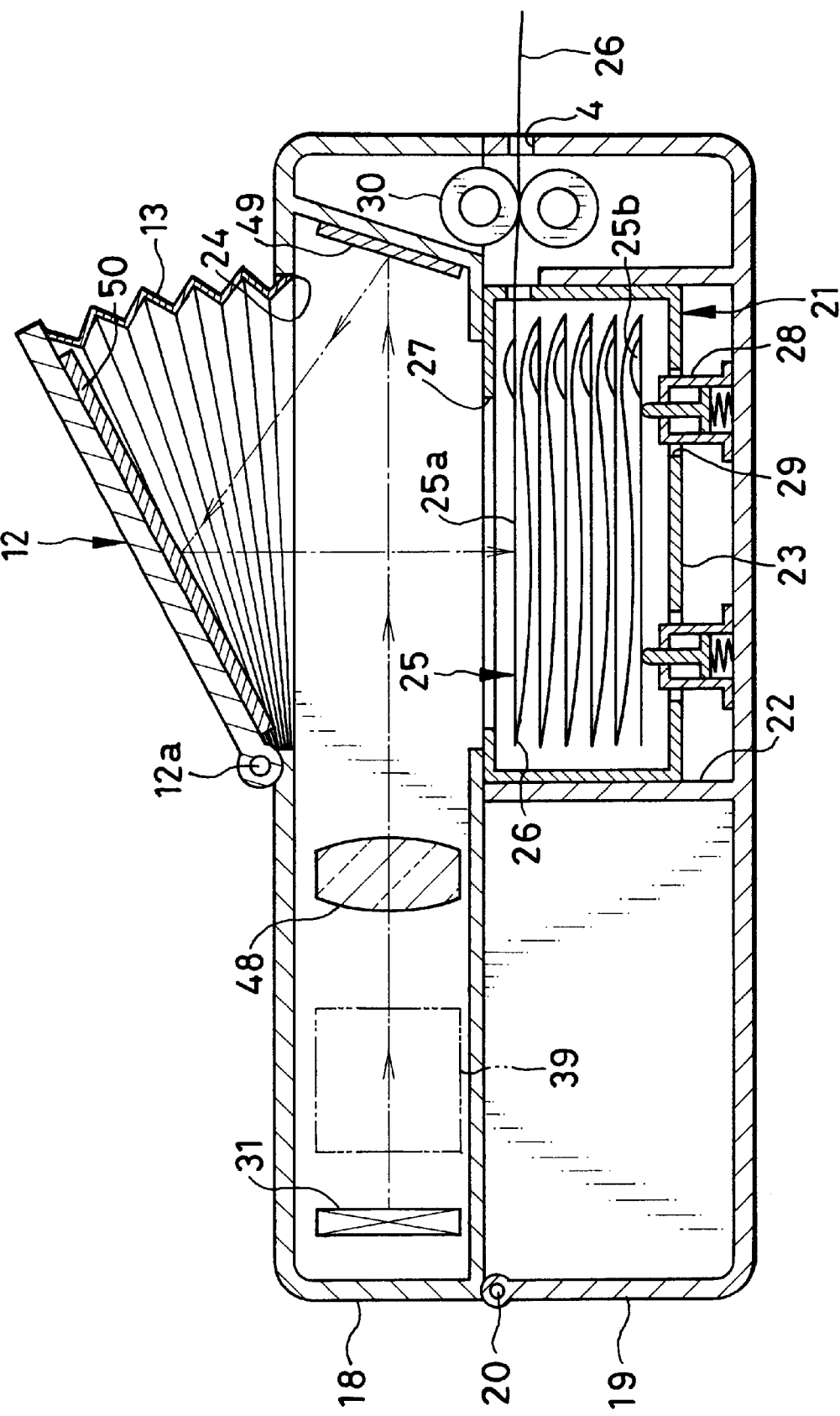
FIG. 3 is a cross section illustrating the printer.

In FIG. 3, the printer 2 is depicted in section. A printer lower wall or cover 19 is connected to a lateral wall portion of the printer upper wall 18 by means of a hinge 20. In loading of a photo film pack 21 as photosensitive material pack, the printer lower wall 19 is swung open to uncover the inside thereof. A loading chamber 22 formed with the printer lower wall 19 is loaded with the photo film pack 21. A case 23 is included in the photo film pack 21, formed from plastic material, and contains a stack of the instant photo film units 25. The instant photo film units 25 are connected one after another by means of connection sheets 26. The photo film pack 21 having this construction is the same as that for use with an instant camera of a conventional type.

A processing solution pod 25b is included in the instant photo film unit 25 and disposed along one edge of a photosensitive surface 25a to contain processing solution. When the photosensitive surface 25a is exposed, a latent image is photochemically created. Thereafter, the processing solution pod 25b is squeezed with pressure and torn open. The processing solution is caused to flow to a photosensitive layer disposed inside the photosensitive surface 25a, so as to obtain a photographic print quickly.

An exposure opening 27 is formed in an upper wall of the case 23, for external access to the photosensitive surface 25a of the instant photo film unit 25 for an exposure. Openings 29 are formed in a lower wall of the case 23, and adapted to insertion of photo film pressure pads 28 on a lower wall of the loading chamber 22. The pressure pads 28 push a lowest one of the instant photo film units 25 in the case 23, press those against an upper wall of the case 23, and keep the photosensitive surface 25a flat. Note that, although not shown in the drawings, a flexible light-shielding sheet is contained in the case 23 and closes the exposure opening 27 in the case 23. The pressure pads 28 contact the light-shielding sheet to push the instant photo film units 25.

A pair of spreader rollers 30 are disposed between the loading chamber 22 and a front wall of the printer, for processing the instant photo film unit 25 being exposed. There is a spring or spacer (not shown) for biasing the spreader rollers 30 toward each other with an unchanged space. Thus, the spreader rollers 30 nip the instant photo film unit 25 with strong force.

An ejection slot 23a is formed in the front wall of the case 23. The connection sheet 26 protrudes through the ejection slot 23a, squeezed by the spreader rollers 30, and partially protrudes from the exit slot 4. After the instant photo film unit 25 is exposed, a user pulls the instant photo film unit 25 between the spreader rollers 30 away from the printer 2. The instant photo film unit 25 is exited from the printer 2 while the processing solution pod 25b is pushed open. Processing solution comes to flow to a photosensitive layer, which is laid inside the photosensitive surface 25a of the instant photo film unit 25. Even when the instant photo film unit 25 comes out of the printer 2, the user continues pulling the instant photo film unit 25 until a portion of a succeeding one of the connection sheets 26 comes out of the exit slot 4. Thus, a succeeding photo film unit 25 is set at the exposure opening 27. The connection sheet 26 to be used for next ejection becomes squeezed by the spreader rollers 30. When the instant photo film unit 25 finishes being processed and becomes ejected, the instant photo film unit 25 is cut away from the connection sheet 26.

Figure 2:
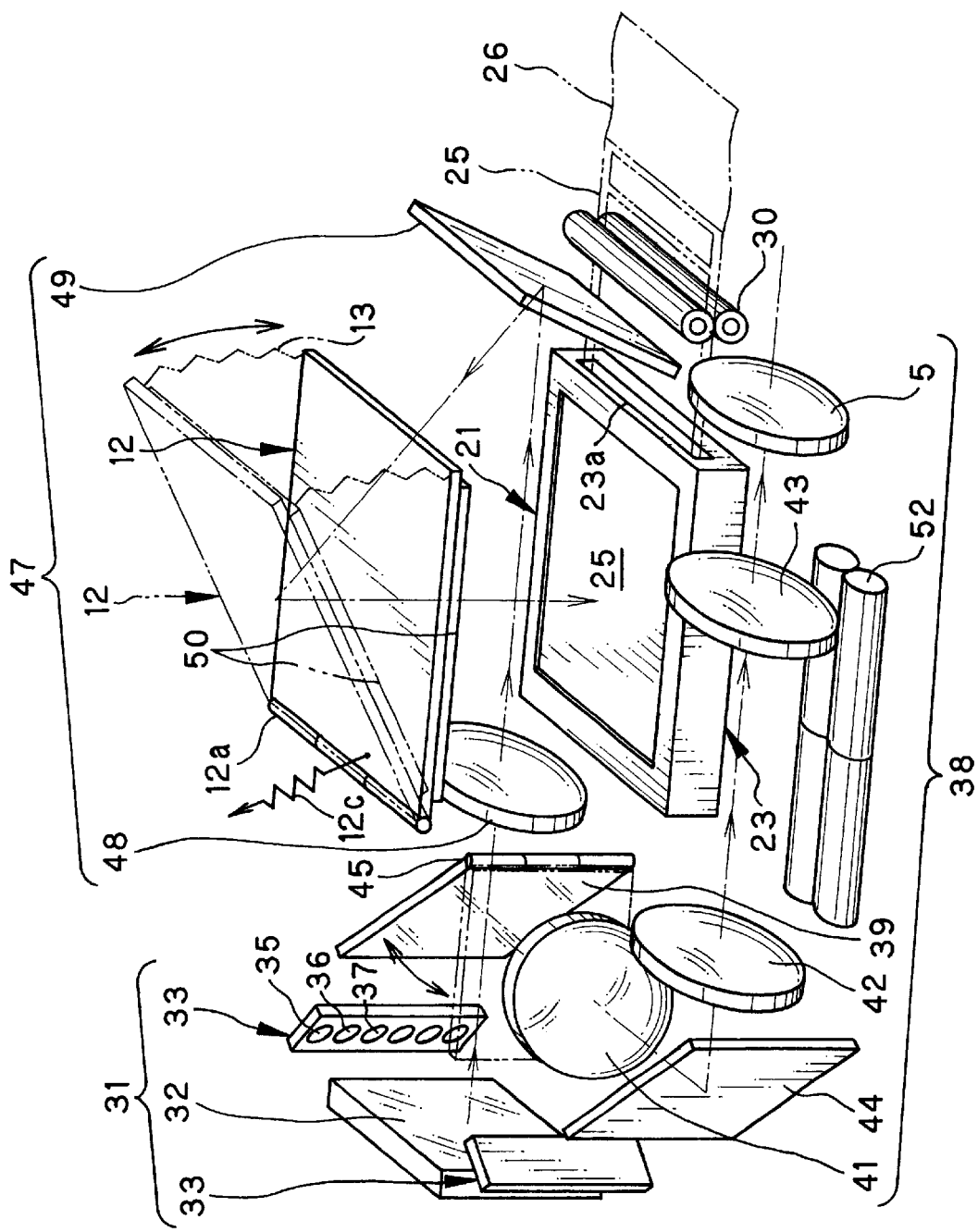
FIG. 2 is an explanatory view in perspective, illustrating a light source, a display panel, optical systems and relevant elements in the printer.

In FIG. 2, a liquid crystal display unit and optical systems in the printer 2 are illustrated. An image forming component 31 is constituted by a LED light source 33 and a reflection type of liquid crystal display (LCD) panel 32 as electronic display panel. The LCD panel 32 is disposed behind the LED light source 33.

The LCD panel 32 includes a great number of liquid crystal dot segments of a reflection type disposed to lie in an incident surface in a matrix form. Reflection density of the liquid crystal dot segments is individually variable by use of an electric signal. The LCD panel 32 is monochromatic itself, and includes pixels all of which are combined to be one image. The LED light source 33 includes first, second and third groups of light-emitting diodes (LED) 35, 36 and 37 and a circuit board. The LEDs 35–37 emit light of three primary colors of red, green and blue, and are connected with the circuit board.

The image forming component 31 has two ways of indication according to the printing and viewing modes described above. In the printing mode, a color image is subjected to color separation of three primary colors. At first, a red image obtained by the color separation is displayed in the LCD panel 32. At the same time, the LEDs 35 of the red color are caused to emit red light. The LCD panel 32 reflects the red light for light emission at light amounts determined according to reflectance factors of the liquid crystal segments. Thus the photosensitive surface 25*a* is exposed for the red color.

When red printing is terminated, then a green image obtained by color separation of an original color image is displayed in the LCD panel 32. Simultaneously, the LEDs 36 are driven to emit green light. The photosensitive surface 25*a* is exposed for the green color. After the exposure for green, then a blue image obtained by color separation of the original color image is displayed in the LCD panel 32. Simultaneously, the LEDs 37 are driven to emit blue light. Therefore, exposures for the red, green and blue colors are effected.

In the viewing mode, the color image is subjected to the three color separation, so as to cause the LCD panel 32 cyclically to display red, green and blue images at a predetermined short period. Also, the LEDs 35, 36 and 37 are driven sequentially in the LED light source 33. While the red image is displayed, the LEDs 35 are driven in synchronism. While the green image is displayed, the LEDs 36 are driven in synchronism. While the blue image is displayed, the LEDs 37 are driven in synchronism. Although the three color images are displayed cyclically in a quick repetition, one color image is virtually displayed as simulation according to a phenomenon of afterimage.

It is to be noted that, instead of the reflection type, the image forming component 31 may include a transmission type of liquid crystal display panel 32. Light is applied to a rear surface of the LCD panel 32, to emit printing light by passage of the light through the LCD panel 32.

Instead of the LCD panel 32, the image forming component 31 may have an electronic display panel of a digital light processing (DLP) type according to a digital micromirror technique. In the DLP display panel, the micromirrors are disposed for respectively pixels, and controlled for changing their reflection angles at an extremely high speed. High and low density is expressed according to time division, to form an image. An example of the micromirrors is disclosed in U.S. Pat. No. 5,933,183.

Furthermore, a color liquid crystal display panel may be used, and include liquid crystal elements and red, green and blue color filters disposed cyclically to cover the liquid crystal elements. A light source for use with this may be a type to emit white light as light of single color. Alternatively, electro luminescent (EL) elements of a self light-emitting type may be used. Red, green and blue color filters may be disposed cyclically to cover the EL elements.

Electro luminescent (EL) elements, to be used in the display panel, may be one of organic and inorganic types. Particularly, an organic type is preferable. As the EL elements emit light by themselves, it is effective in shortening a light path from the display panel to the photosensitive surface 25*a* of the instant photo film unit 25. Sharply printed images can be obtained.

A viewing optical system 38 is constituted by a movable mirror 39 as light path changer, enlarging lenses 41, 42 and 43 and a stationary mirror 44. The movable mirror 39 and the stationary mirror 44 are disposed in positions within a light path from the image forming component 31 to the viewing window 5. The light path is bent for two times, and thus has a Z-shape.

The enlarging lens 41 is disposed between the movable mirror 39 and the stationary mirror 44. The enlarging lenses 42 and 43 are disposed between the stationary mirror 44 and the viewing window 5. The enlarging lenses 41, 42 and 43 enlarges an image formed by the LCD panel 32, and cause printing light to travel through the viewing window 5. As the image to be printed is focused at the viewing window 5 in enlargement, an orientation of the simulated image is vertically reverse to that of an image displayed in the LCD panel 32. However, the LCD panel 32 is controlled in the viewing mode in such a manner as to display the image in an orientation vertically reverse to an original orientation of the image. Thus, the image can be observed through the viewing window 5 in a properly oriented state.

A hinge 45 supports the movable mirror 39 in a pivotally movable manner. In the printing mode, the movable mirror 39 is caused to make counterclockwise rotation by 45 degrees about the hinge 45, to come to a retracted position indicated by the phantom lines. In the printing mode, the movable mirror 39 does not block the exposing light path to be described later.

In FIGS. 2 and 3, an exposure optical system 47 is constituted by an enlarging lens 48, a stationary mirror 49 and a movable mirror 50 as printing light path former. When the printing mode is set instead of the viewing mode, the movable mirror 39 rotates to the retracted position. The movable panel 12 rotates to the open position. The movable mirror 50 mounted on the movable panel 12 rotates together to come to a position indicated by a phantom line.

The stationary mirror 49 and the movable mirror 50 are disposed in positions within a light path from the image forming component 31 to the photosensitive surface 25*a*. The light path is bent for two times, so a final direction of printing light is vertical to that before the bending for the two times. Also, the enlarging lens 48 enlarges an image formed in the image forming component 31 to expose the photosensitive surface 25*a*.

As the image to be printed is focused at the photosensitive surface 25*a* in enlargement, an orientation of the simulated image focused on the photosensitive surface 25*a* is horizontally inverted in view of that of an image displayed in the image forming component 31. However, the image forming component 31 is controlled in the printing mode in such a manner as to display the image in an orientation horizontally inverted in view of an original orientation of the image. Thus, the image can be projected to the photosensitive surface 25a in a properly oriented state.

The printer 2 is driven by batteries 52 for the purpose of the use with portability. In FIG. 2, the batteries 52 are contained under the viewing optical system 38 inside the printer lower wall 19.

Figure 4:
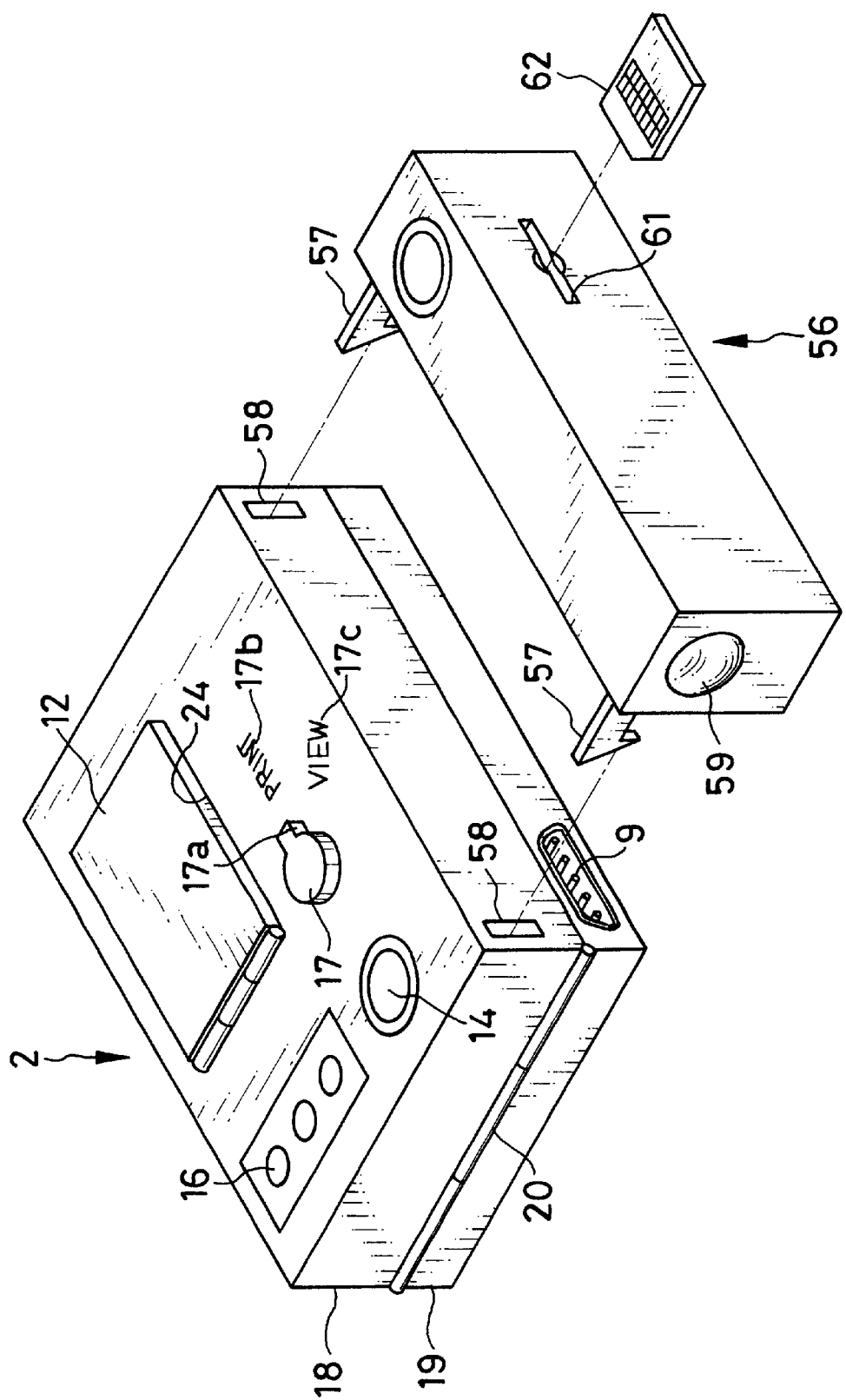
FIG. 4 is a perspective illustrating the printer together with a digital still camera.

In FIG. 4, a digital camera 56 or electronic still camera can be used with the printer 2 in connection. Retention hooks 57 protrude from the digital camera 56. Retention holes 58 are formed in the printer 2, and retain the retention hooks 57 removably. There are a taking lens 59 and a CCD image sensor (not shown) or image area sensor, which is disposed behind the taking lens 59 for picking up an image of a photographic object. Image data of the image picked up by the digital camera 56 is sent through the connection terminals 9 to the printer 2. Furthermore, it is also possible to store image data to a memory card 62 as storage device, which is set in a memory card slot 61. In the present invention, the digital camera 56 is connected directly to the printer 2. Alternatively, a connection code may be used for connection of the digital camera 56 to the connection terminals 9 of the printer 2.

Also, the printer 2 may be provided with the memory card slot 61 in which the memory card 62 can be inserted for reading or retrieving of image data from the memory card 62.

The operation of the above construction is described. To use the printer 2, the power switch 11 is turned on to power the printer 2. There are plural preset ways of inputting image data to the printer 2. For example, image data is input through the connection terminals 9 by connection of an external equipment such as a video camera, video tape recorder, personal computer, cellular telephone and the like. Also, image data is input from the memory card 62 set in the digital camera 56.

To input image data from the memory card 62, the digital camera 56 is set on and connected to the printer 2 while the printer 2 is turned off. The memory card 62 is inserted in the memory card slot 61 next. After this, the power source of the printer 2 is turned on. This is for the purpose of protecting data in the memory card 62 from being damaged upon setting of the memory card 62 while the printer 2 is turned on.

After the power source for the printer 2 is turned on, the mode selector 17 is changed over to set the viewing mode. In FIG. 2, the movable mirrors 39 and 50 in the viewing mode are in the positions indicated by the solid lines. Then various keys or buttons in the operation panel 16 are operated to select and determine one of inputting ways of image data. Thus, image data is input.

Image data is read from the memory card 62 when a user operates by the operation panel 16 for inputting. The image data is subjected to signal processing for white balance adjustment, gamma correction, inversion of vertical orientation according to correction of image orientation, and the like, and then is sent to the image forming component 31. The LCD panel 32 displays an image according to the processed form of the image data. The viewing optical system 38 enlarges the image of the image forming component 31 and also inverts the same vertically. The image according to the image signal being input is focused on the viewing window 5.

Various buttons or keys in the operation panel 16 are operated to read image data serially from the memory card 62, so a user can observe each of images through the viewing window 5. Then he or she designates a selected one of images by checking observed images.

When an image to be printed is determined, then the mode selector 17 is operated to set the printing mode. The movable mirrors 39 and 50, when in the printing mode, are in the positions indicated by the phantom lines of FIG. 2. After setting of the printing mode, the viewing window 5 is depressed. When the printing signal is input, the image data is subjected to conversion for white balance adjustment, gamma correction, inversion of horizontal orientation. According to the converted image data, the LCD panel 32 is driven to display only a red image as a component obtained by color separation of the converted image.

The LCD panel 32 displays a red image according to the image data. The red image is enlarged and inverted horizontally by the viewing optical system 38. The red image is projected to the photosensitive surface 25a according to the input image data.

When exposure of the red color is terminated, then the image forming component 31 is driven to display green and then blue images, to expose the photosensitive surface 25a. Note that exposure time by use of the image forming component 31 can be adjusted automatically according to density of image data, but may be determined manually by a user. Alternatively, a current to drive the LEDs 35–37 in the LED light source 33 may be adjusted instead of the exposure time, to adjust light amounts of the LEDs 35–37.

After the instant photo film unit 25 is exposed, the user pulls the connection sheet 26 to eject the instant photo film unit 25 through the exit slot 4. Then the connection sheet 26 is cut away. After the ejection, the instant photo film unit 25 comes to have a visible positive image after lapse of sufficient time required for processing and transfer.

In conclusion, the LCD panel 32 as a single unit is used for both exposure and observation. The movable mirrors 39 and 50 are changed over and also the orientation of an image is inverted, so that both of the printing mode and the viewing mode can be set selectively. The instant photo film units 25 are ejected manually. This is effective in simplifying a structure of the spreader rollers 30.

It is to be noted that the movable mirror 39 is shifted to one of viewing and printing positions according to one position of either of the viewing and printing modes where the mode selector 17 is set. To this end, a pivot of the mode selector 17 is connected directly or indirectly to the hinge 45 of the movable mirror 39 so as to transmit shift mechanically.

Preferably, a linking mechanism is used between the mode selector 17 and the lock mechanism 10 for the purpose of pivotally moving the movable mirror 50. When the mode selector 17 is set in the position of the printing mode, the lock mechanism 10, which retains the hook 12b, is caused by the linking mechanism to move in an unlocking direction. In response to this, the spring 12c operates to swing the movable mirror 50 and set the same in the open position.

To move the movable mirror 50 back to the closed position, it is possible that one shifting mechanism is used to shift the movable mirror 50 mechanically. Alternatively, a user may manually push the movable panel 12 directly and shift it to the closed position.

Furthermore, the mode selector 17 may be constructed as a switch for generating a drive signal. Solenoids may be used, driven in response to the drive signal, and shift the movable mirrors 39 and 50 in the manner the same as the above construction.

In the above embodiment, the photo film pack 21 contains the instant photo film units 25, which are pulled out manually one after another. However, the photo film pack 21 may be ejected by mechanisms driven by a motor in a manner of well-known instant cameras. JP-A 4-194832 discloses an example of such a construction. Also, the instant photo film units 25 may be loaded without use of the photo film pack 21. A printer may be directly loaded with the instant photo film units 25 one after another, to effect exposing and developing processes.

Figure 5:
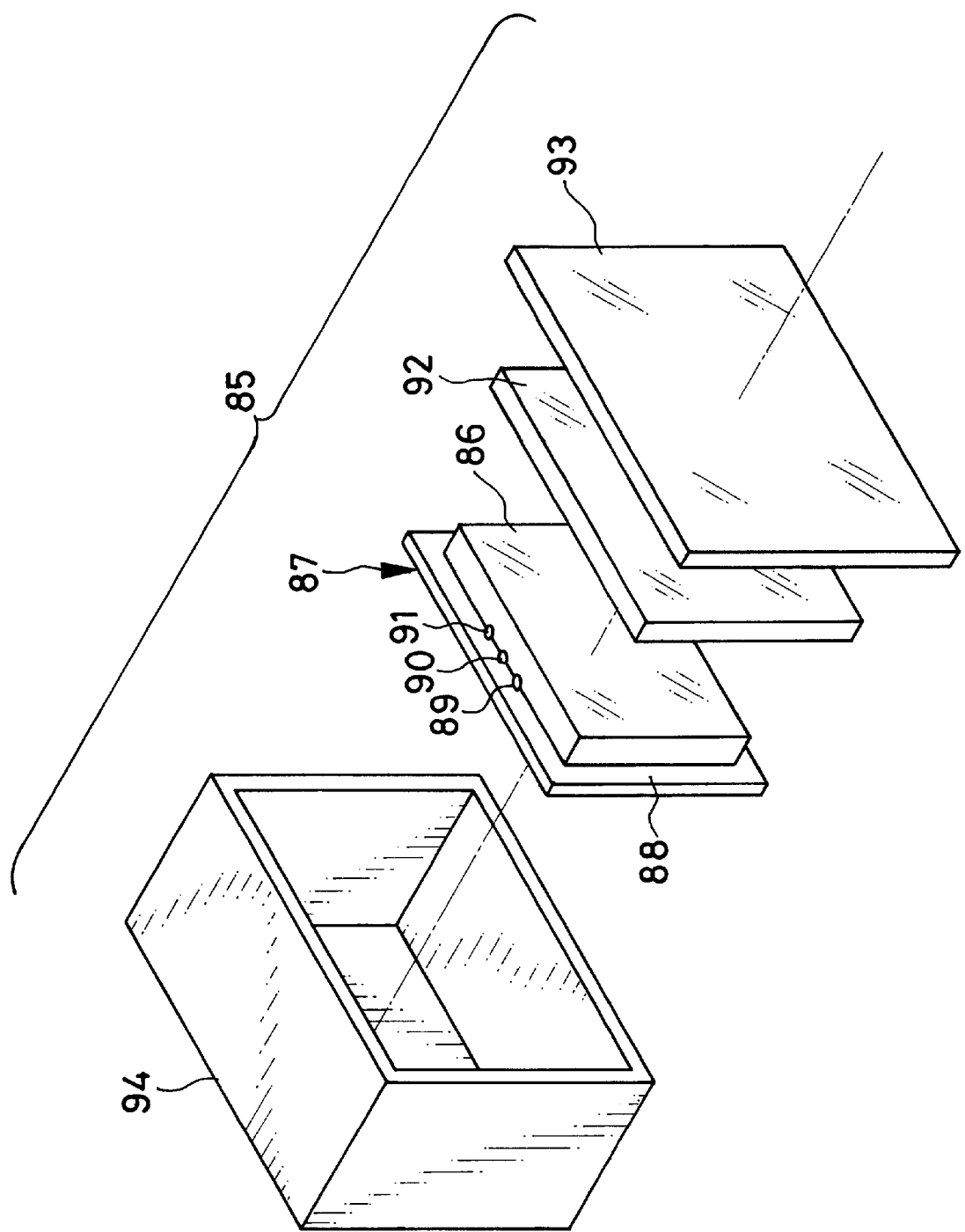
FIG. 5 is an exploded perspective illustrating another image forming unit having three LEDs and an LCD panel.

FIG. 5 illustrates another preferred combination of a light source and a display panel. An image forming component 85 includes an LCD panel 92, an LED light source 87 and a diffusing plate 86, which are contained between a case 94 and a protecting cover 93. The LED light source 87 is constituted by a circuit board 88, a red LED 89, a green LED 90 and a blue LED 91. The red, green and blue LEDs 88, 90 and 91 are disposed on a lateral face of the diffusing plate 86, and emit light toward the inside of the diffusing plate 86. Light of the three colors is passed through the LCD panel 92, and travels along a light path directed toward the front of the protecting cover 93. This construction is advantageous in that the LED light source 87 and the LCD panel 92 are contained in the case 94, so the back-to-front thickness of the image forming component 85 can be small in comparison with the image forming component 31 according to the above embodiment, to reduce the size and weight of the printer.

In the above embodiments, an image is printed according to a frame sequential printing. However, an image may be printed according to line printing. A line type of exposure head extending in a main scan direction may be used, and moved in a sub scan direction line by line.

In the above embodiments, the printer is a color printer. Also, the printer and the instant photo film units 25 for use therewith may be monochromatic.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer comprising:

a light source for emitting illuminating light;

an electronic display panel for displaying an image, and for emitting printing light upon being illuminated with said illuminating light;

a loading chamber for being loaded with a photosensitive material so oriented as to direct upwards a photosensitive surface of said photosensitive material, said photosensitive surface being exposed to said printing light;

an exposing optical system for focusing said printing light on said photosensitive surface of said photosensitive material;

a first stationary mirror in an opposite side of said loading chamber from said exposing optical system, said first stationary mirror reflecting said printing light from said exposing optical system; and a printing light path former with a first movable mirror over said loading chamber and between said first stationary mirror and said exposing optical system, said printing light path former being disposed to constitute one portion of a printer outer surface, movable between first and second positions, for protruding from said printer outer surface when set in said first position so that said first movable mirror forms a printing light path from said first stationary mirror to said photosensitive material, and for being substantially flush with said printer outer surface when set in second position so that said first movable mirror prevents forming of said printing light path.

2. A printer as defined in claim 1, further comprising:

a viewing window observable externally;

a viewing optical system for directing said printing light to said viewing window; and a light path changer, disposed in a light path between said display panel and said exposing optical system, shiftable between third and fourth positions, for directing said printing light to said exposing optical system when set in said third position, and for directing said printing light to said viewing optical system when set in said fourth position.

3. A printer as defined in claim 2, wherein said printing light path former includes a movable panel to which said first movable mirror is secured; and said light path changer includes a second movable mirror.

4. A printer as defined in claim 3, wherein said exposing optical system includes:

an enlarging lens for enlarging said image.

5. A printer as defined in claim 4, further comprising:

a printer upper wall for constituting said printer outer surface;

an opening formed in said printer upper wall, and closed openably by said movable panel in a manner swingable from said printer upper wall; and bellows, connected between peripheries of said movable panel and said opening, for preventing ambient light from entry into said printing light path through said opening when said movable panel is set in said first position.

6. A printer as defined in claim 5, wherein said photosensitive material is color photosensitive material;

said light source includes at least first, second and third groups of light-emitting diodes, arranged in at least one array, for generating said illuminating light of respectively first, second and third primary colors.

7. A printer as defined in claim 6, further comprising a mode selector for designating a selected one of a printing mode and a viewing mode, for setting said second movable mirror in said third position when said printing mode is designated, and for setting said second movable mirror in said fourth position when said viewing mode is designated.

8. A printer as defined in claim 7, further comprising:

a bias mechanism for biasing said movable panel toward said first position; and a lock mechanism for locking said movable panel in said second position, and for unlocking said movable panel when said mode selector designates said printing mode.

9. A printer as defined in claim 8, comprising:

a printer front wall where said viewing window is disposed; and an exit slot, formed in said printer front wall, for exiting said photosensitive material being exposed.

10. A printer as defined in claim 9, wherein said display panel is a transmittance type of liquid crystal display panel for converting said illuminating light into said printing light by passage when a rear surface thereof is illuminated by said light source.

11. A printer as defined in claim 8, wherein said photosensitive material is an instant photo film unit;
further comprising a pair of spreader rollers for processing said instant photo film unit being exposed, and for ejecting said instant photo film unit from said loading chamber.

12. A printer as defined in claim 3, wherein said loading chamber is loaded with a photosensitive material pack;
said photosensitive material pack includes:
a case; and
a stack of plural photosensitive materials contained in said case.

13. A printer as defined in claim 3, wherein said display panel and said light source are supplied by a battery with power.

14. A printer as defined in claim 3, wherein said printer is connected with a digital camera or storage device;
said display panel displays said image according to image data input by said digital camera or storage device.

15. A printer as defined in claim 3, wherein said display panel is a reflection type of liquid crystal display panel for converting said illuminating light into said printing light by reflection when a front surface thereof is illuminated by said light source.

16. A printer as defined in claim 3, wherein said display panel includes plural rotatable micromirrors arranged in a matrix form, and converts said illuminating light into said printing light by reflection when said micromirrors in an effective position of reflection are illuminated by said light source.

17. A printer as defined in claim 3, wherein said display panel comprises a liquid crystal display panel, a micromirror device or an electro luminescent device.

18. A printer comprising:
a light source for emitting illuminating light;
an electronic display panel for displaying an image and for emitting printing light when illuminated by the illuminating light from said light source;
a loading chamber for receiving a photosensitive material whose photosensitive surface is exposed to the printing light when the printer is operated;
a first reflector in a fixed position next to said loading chamber;
an exposing optical system that is on an opposite side of said loading chamber from said first reflector and that directs the printing light to said first reflector via a first light path that extends across and parallel to said loading chamber; and
a printing light path former with a second reflector over said loading chamber and between said exposing optical system and said first reflector, said printing light path former being movable between a first position and a second position, said printing light path former protruding from an outer surface of the printer so that said second reflector creates a second light path for the printing light from said first reflector to said loading chamber when said printing light path former is in the first position, and said printing light path former being substantially flush with an outer surface of the printer so that said second reflector does not create the second light path when said printing light path former is in the second position.

19. The printer of claim 18, further comprising an image viewing port and a viewing optical system for selectively directing the printing light to said image viewing port when said printing light path former is in the first position and in the second position.

20. The printer of claim 18, further comprising an image viewing port and a viewing optical system for selectively directing the printing light to said image viewing port via a third light path that is spaced from and parallel to the first light path.

21. The printer of claim 20, further comprising a third reflector that is selectively movable between an image forming position in which said third reflector protrudes into the first light path and directs the printing light to the third light path and a printing position in which said third reflector does not protrude into the first light path.

22. The printer of claim 21, wherein said third reflector is selectively movable between the image forming position and the printing position when said printing light path former is in the first position and in the second position.

23. A printer comprising:
a light source for emitting illuminating light;
an electronic display panel for displaying an image and for emitting printing light when illuminated by the illuminating light from said light source;
an exposing optical system for focusing the printing light on a photosensitive surface of a photosensitive material;
a printing light path former that is movable between a first position and a second position, said printing light path former protruding from an outer surface of the printer and forming a light path for the printing light from said exposing optical system to the photosensitive surface when in the first position, and being substantially flush with an outer surface of the printer and not forming the light path for the printing light when in the second position; and
an image viewing port and a viewing optical system for selectively directing the printing light to said image viewing port when said printing light path former is in the first position and in the second position.

24. The printer of claim 23, further comprising a reflector that is selectively movable between an image forming position in which said reflector protrudes into a first light path from said exposing optical system to direct the printing light to said viewing optical system and a printing position in which said reflector does not protrude into the first light path, said viewing optical system directing the printing light in a second light path parallel to and spaced from said first light path.

25. A printer comprising:
a light source for emitting illuminating light;
an electronic display panel for displaying an image and for emitting printing light when illuminated by the illuminating light from said light source;
an exposing optical system for focusing the printing light on a photosensitive surface of a photosensitive material, said exposing optical system initially directing the printing light in a first light path that is across and parallel to the photosensitive surface;
a printing light path former that is movable between a first position and a second position, said printing light path former protruding from an outer surface of the printer and forming a second light path for the printing light from the first light path to the photosensitive surface when in the first position and being substantially flush with an outer surface of the printer and not forming the second light path for the printing light when in the second position;

an image viewing port and a viewing optical system for selectively directing the printing light to said image viewing port via a third light path that is parallel to and spaced from said first light path; and a reflector that is selectively movable between an image forming position in which said reflector protrudes into the first light path to direct the printing light to said viewing optical system and a printing position in which said reflector does not protrude into the first light path.

* * * * *